United States Patent [19]

Kulka

[11] 4,157,052

[45] Jun. 5, 1979

[54] SELF-LEVELING STUD

[75] Inventor: Frederick C. Kulka, Warren, Mich.

[73] Assignee: General Motors Corporation, Detroit, Mich.

[21] Appl. No.: 849,025

[22] Filed: Nov. 7, 1977

[51] Int. Cl.² .................. F16B 19/00; F16B 23/00
[52] U.S. Cl. .................................. 85/9 R; 85/62
[58] Field of Search ............. 85/9 R, 50 R, 50 A, 85/50 C, 62; 151/37

[56] References Cited

U.S. PATENT DOCUMENTS

| | | | |
|---|---|---|---|
| 1,362,623 | 12/1920 | Hochberger | 85/50 R |
| 1,923,647 | 8/1933 | Vera | 151/37 |
| 1,956,745 | 5/1934 | Payne | 151/37 |
| 2,943,528 | 7/1960 | Curry | 85/62 |
| 3,187,621 | 6/1965 | Turner | 85/62 |
| 3,245,449 | 4/1966 | Mitchell | 151/37 |
| 3,521,454 | 7/1970 | Dodds | 85/50 A |

FOREIGN PATENT DOCUMENTS 1418021 12/1975 United Kingdom ................ 85/9 R

Primary Examiner—Lawrence J. Staab
Attorney, Agent, or Firm—K. H. MacLean, Jr.

[57] ABSTRACT

A stud fastener for attaching one body member to the irregular surface of a second body member so that the axis of the stud fastener is not obliquely cocked with respect to the plane of the second body member. The stud fastener has an annular collar with struck-out contact portions thereon which remain connected to the collar by a reduced area of contact to provide a yieldable connection with the second surface, permitting movement of the contacts toward the plane of the collar as a nut fastener brings the collar against the irregular surface of the second body member. In a preferred embodiment, three pads or contacts are formed and when all three have engaged the second surface, the nut fastener is torqued out so that the stud is solidly secured to the second surface without cocking of its axis with respect to the plane of the second surface.

2 Claims, 4 Drawing Figures

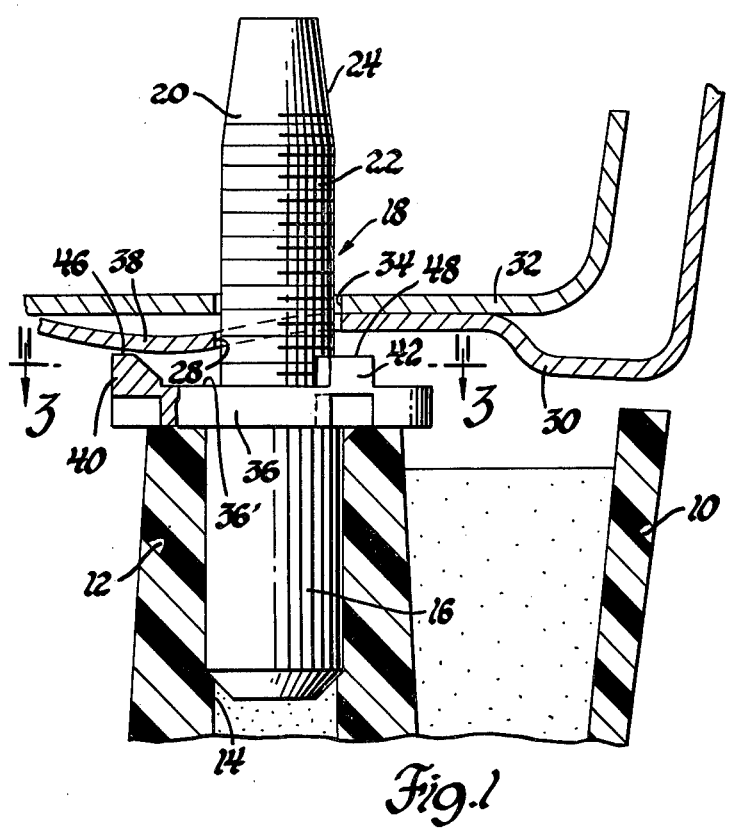
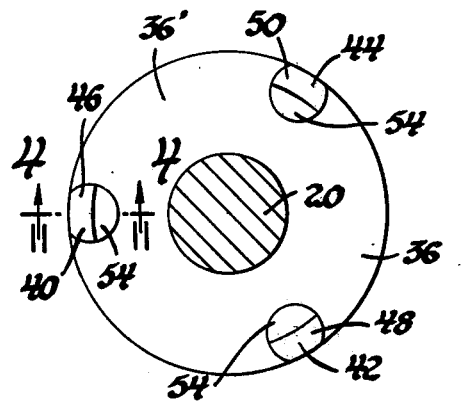
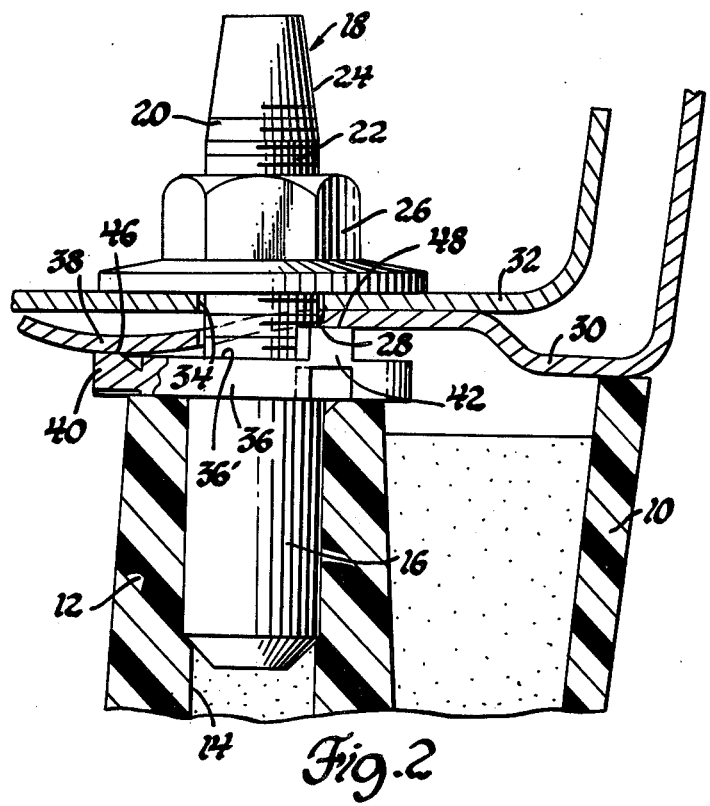

SELF-LEVELING STUD

In several applications and particularly in the attachment of a plastic body member of a vehicle to a metal body member, stud fasteners can be utilized for attachment purposes. The stud fastener has an end portion configured to be gripped by the plastic body member such as by providing an apertured boss to accept the stud. An opposite end portion of the stud is threaded to extend through an opening in the metal body member, then to be engaged by a nut fastener on the other side of the metal body. Often, there are surface irregularities in the metal body member which may cause the axis of the fastener to be cocked at an angle with respect to the plane of the metal body member. This may undesirably distort the plastic body part as the stud is cinched against the metal body member.

The subject stud fastener includes means for tightening the fastener against an irregular planar surface of a metal body member without biasing the stud axis at an oblique angle with respect to the planar surface. Specifically, an annular collar portion is formed on the stud member. At three spaced locations about the circumference of the collar, offset contact pads are provided and adapted to engage the irregular surface of the metal body member. The contact pads are formed by striking out or shearing a substantially circular area on the peripheral edge of the collar so that offset surfaces or pads which result are away from the planar surface of the collar. The shearing operation is only partially performed sufficient to maintain an integral connection between the pads and the collar portion. Resultantly, when the nut fastener is torqued down against the other surface of the metal body member, one shear pad first engages a surface portion of the body member and is forced back toward the surface plane of the collar until a second contact pad is engaged. Thereafter, the second contact pad to be engaged is also forced back toward the plane of the collar until a third pad is engaged. Consequently, the collar portion of the stud fastener is seated firmly against the irregular surface of the metal body member while the stud axis remains substantially perpendicular to the planar extent of the metal body member.

Other advantages, features and applications of the subject stud fastener will be readily understood and comprehended after a reading of the following detailed description, reference being had to the accompanying drawings in which a preferred embodiment of the stud fastener is illustrated.

IN THE DRAWINGS

FIG. 1 is a sectioned view of the subject stud fastener and body panels as shown in an initial assembly position FIG. 2 is a view similar to FIG. 1 once the nut fastener has been tightened and the body panels are assembled;

FIG. 3 is a sectioned view of the stud collar portion taken along section line 3—3 and looking in the direction of the arrows; and FIG. 4 is an enlarged sectioned view of one of the contact pads taken along section line 4—4 in FIG. 3 and looking in the direction of the arrows.

In the drawings, FIGS. 1 and 2 illustrate a first body member 10 preferably of plastic material such as polyethylene. The body member 10 may be a quarter panel extension and it includes tubular boss portion 12 with an internal bore 14 therein. In assembled position with the stud fastener, the bore 14 grippingly engages a cylindrical end portion 16 of stud fastener assembly 18. Bore 14 is purposely smaller than the diameter of portion 16 so as to provide a tight press fit. The stud fastener 18 has an opposite second end portion 20 which is threaded at 22 along its length. The extreme end is formed in a tapered surface 24 adapted to permit easy application of a nut fastener 26 which is shown in FIG. 2.

When the member 10 is assembled to another body member, the end portion 20 is inserted through an opening 28 in the second body member 30. Member 30 may be a rear quarter panel of a vehicle and is preferably of metal. The second body member 30 has a backup member or stiffener 32 with an opening 34 therein Openings 28 and 34 are aligned. It is not essential to the application of the subject stud fastener that a second body portion be present.

The stud fastener assembly 18 includes an annular collar member 36 near its midportion which is integral with portions 16 and 20 and has a planar configuration perpendicular to the stud axis. The collar portion 36 is adapted to engage the surface of member 30 in a manner so as to maintain the stud fastener axis normal with respect to the planar extent of the member 30. Frequently there are irregularities in the thin sheet metal body members such as member 30. Such an irregularity may be in the form of a ripple or bubble as shown by the numeral 38 in FIGS. 1 and 2. The irregularity 38 as shown is exaggerated for a clearer understanding, although such a large irregularity is possible. A stud fastener with only a flat planar collar was previously used to assemble the parts. As the collar 40 and member 30 are engaged, contact of the leftward portion of the collar with the raised surface portion of member 30 will cause the stud axis to tilt or cock with respect to the planer extent of member 30.

Forced tilting of the axis may cause distortion in the surface of the plastic body member 10. To prevent tilting of the stud axis, the collar portion of the stud has three contact pad portions 40, 42 and 44 formed therein. In FIGS. 3 and 4 it is revealed that the pads are nearly cylindrical in cross section and have been pushed out or offset by a shearing operation from the plane of collar 36 to provide surfaces 46, 48 and 50 spaced upward from the surface 36' of the collar 36. The pad 40 shown in FIG. 4 is typical of the three pads and is formed by a shearing operation by the application of a localized force F. The pad 40 is left connected to the collar 36 by an integral portion 52. An inclined surface 54 is formed on the pads so that any contact is at surface 46 located near the edge of the pad 40. When the nut 26 is tightened down upon the threaded portion 22 to the position shown in FIG. 2, the collar 36 moves toward the surface of member 30. This is accompanied by movement of member 10 toward member 30. When an irregularity such as at 38 is encountered, one pad 40 is first engaged. As the nut 26 is tightened further on the thread portion, the surface 46 of pad 40 is forced back toward the top surface 36' of the collar 36. Simultaneously, the fastener assembly 18 moves upward toward surface 30 without tilting the axis of the fastener 18 with respect to the plane of member 30. The collar portion 36 moves further upward until a second pad (either of pads 42 or 44) engages member 30. Thereafter, the second pad is forced back toward its pre-shear configuration so that its contacting surface (42 or 44) is moved toward the upper surface 36' of the collar portion 36. Thereafter, when the third pad is engaged by the surface of member 30, a solid seat is formed against the irregular surface to prevent tilting of the stud axis.

In the embodiment illustrated, three contact pads are provided which could be sufficient for most applications. However, the addition of more or less than three is contemplated for special applications and without falling outside the scope of the invention as described in the claims. Modification of the extent to which the pads are moved to be offset from the plane of collar 36 is also contemplated. In the embodiment shown, the integral connecting surface between the offset contact pads and the collar is designed such that the force required to begin movement of the pad to its pre-shear position is one-third the torque specification for the nut fastener. Thus, as the third pad is seated, the nut driver torques out. It is obvious that if other applications of this invention require differing results, this integral connection between the pads and the collar may be modified without falling outside the scope of the following claims.

What is claimed is as follows:

1. A stud fastener for attaching one body member which rigidly supports the stud fastener to an apertured second body member having surface irregularities presenting raised and lowered portions from its general planar extent, comprising: a non-rotatable stud with an elongated body including a first end portion projecting into the one body member for gripping engagement and support thereby establishing a substantially fixed angular orientation therewith with the stud fixed against rotation, an opposite second end portion adapted to extend through the aperture in the second body member and being threaded to accept a nut fastener adapted to contact a first surface of the second body member, a radially extending collar portion between the first and second end portions having a planar surface perpendicular to the stud axis adjacent another surface of the second body member opposite to the nut-engaging first surface, a plurality of circumferentially spaced contact pad portions integral with said collar portion located peripherally along the collar edge and adapted to engage the other surface of the second body member as the collar portion is moved thereagainst, said pad portions defining surfaces offset away from said planar surface of said collar portion formed by a localized application of a force so as to bodily move in a shearing manner the pad portions away from said planar surface, leaving a connecting portion with the collar portion sufficient to yieldingly resist return movement to the pre-shear configuration as the offset surfaces engage and provide for said planar surface to be drawn at least partially against said second body member.

2. A stud fastener for attaching one body member which rigidly supports the stud fastener to an apertured second body member having surface irregularities, including raised and lowered portions from the general planar extent of the second body member, comprising: a non-rotatable stud with an elongated body including a first end portion projecting into the one body member for gripping engagement and support thereby establishing a substantially fixed angular orientation therewith with the stud fixed against rotation, an opposite second end portion adapted to extend through the aperture in the second body member and being threaded to accept a nut fastener adapted to contact a first surface of the second body member, a radially extending collar portion between the first and second end portions having a planar surface perpendicular to the stud axis adjacent another surface of the second body member opposite to the nut-engaging first surface, at least two circumferentially spaced pad portions integral with said collar portion located peripherally along the edge of the collar and adapted to engage the other surface of the second body member as the collar is moved thereagainst, contact surfaces on each pad portion in a plane offset from said planar surface of the collar toward the second body member formed by the localized application of a force so as to bodily move in a shearing manner the pad portions away from said planar surface, leaving an integral connecting portion with the collar portion sufficient to resist return movement of the pads to the pre-shear configuration and requiring an axial force produced by tightening of said nut to begin the return movement, said integral connecting portion being formed so that said axial force is equal to a predetermined portion of the desired torque force to be applied to said nut fastener, whereby sequential engagement of said contact surfaces with the second body member moves the pad portions toward the pre-shear configuration until the last pad portion engages the second body member, at which point the predetermined torque has been applied to the nut fastener and a stable multi-point seat of the collar portion against the second body member is established with said planar surface drawn at least partially against the second body member to provide at least one of the seats.

* * * * *

UNITED STATES PATENT AND TRADEMARK OFFICE
CERTIFICATE OF CORRECTION

PATENT NO. : 4,157,052

DATED : June 5, 1979

INVENTOR(S) : Frederick C. Kulka

It is certified that error appears in the above-identified patent and that said Letters Patent are hereby corrected as shown below:

Column 1, line 54, after "position" insert ---; --.

Column 2, line 14, after "therein" insert -- . --.

Column 3, line 4, "could" should be --would--.

Signed and Sealed this

Ninth Day of October 1979

[SEAL]

Attest:

RUTH C. MASON
Attesting Officer

LUTRELLE F. PARKER
Acting Commissioner of Patents and Trademarks